(12) United States Patent
Stein

(10) Patent No.: US 6,775,977 B2
(45) Date of Patent: Aug. 17, 2004

(54) HYDROSTATIC TRANSMISSION

(75) Inventor: Harald Stein, Schaafheim (DE)

(73) Assignee: Linde Aktiengesellschaft (DE)

(*) Notice: Subject to any disclaimer, the term of this patent is extended or adjusted under 35 U.S.C. 154(b) by 0 days.

(21) Appl. No.: 10/246,787

(22) Filed: Sep. 17, 2002

(65) Prior Publication Data
US 2003/0079471 A1 May 1, 2003

(30) Foreign Application Priority Data
Sep. 18, 2001 (DE) .......................................... 101 45 990

(51) Int. Cl.[7] .............................................. F16H 39/04
(52) U.S. Cl. ........................................ 60/487; 60/490
(58) Field of Search .......................... 60/487, 488, 489, 60/490, 491, 492

(56) References Cited

U.S. PATENT DOCUMENTS 4,134,311 A * 1/1979 Orshansky et al. ........... 475/81
6,122,914 A * 9/2000 Hayashi et al. .............. 60/489
6,324,843 B1 * 12/2001 Yasuda et al. ............... 60/489
6,530,218 B2 * 3/2003 Saito et al. .................. 60/489

FOREIGN PATENT DOCUMENTS

DE 1 945 440 3/1971

* cited by examiner

Primary Examiner—Thomas E. Lazo
(74) Attorney, Agent, or Firm—Webb Ziesenheim Logsdon Orkin & Hanson, P.C.

(57) ABSTRACT

A hydrostatic transmission includes a pump and a motor, each of which is an axial piston engine utilizing a swashplate design. The pump and the motor are located coaxially one behind the other and are connected to each other. To expand the range of possible uses of the hydrostatic transmission and retain its compact size, the motor has a hollow output shaft, through which a power take-off shaft driven by a drive shaft of the pump is routed. The swashplate of the pump and the swashplate of the motor can be located on opposite ends of the hydrostatic transmission. Axially between the cylinder drum of the pump and the cylinder drum of the motor there is a common control base mount which is provided with supply channels.

9 Claims, 1 Drawing Sheet

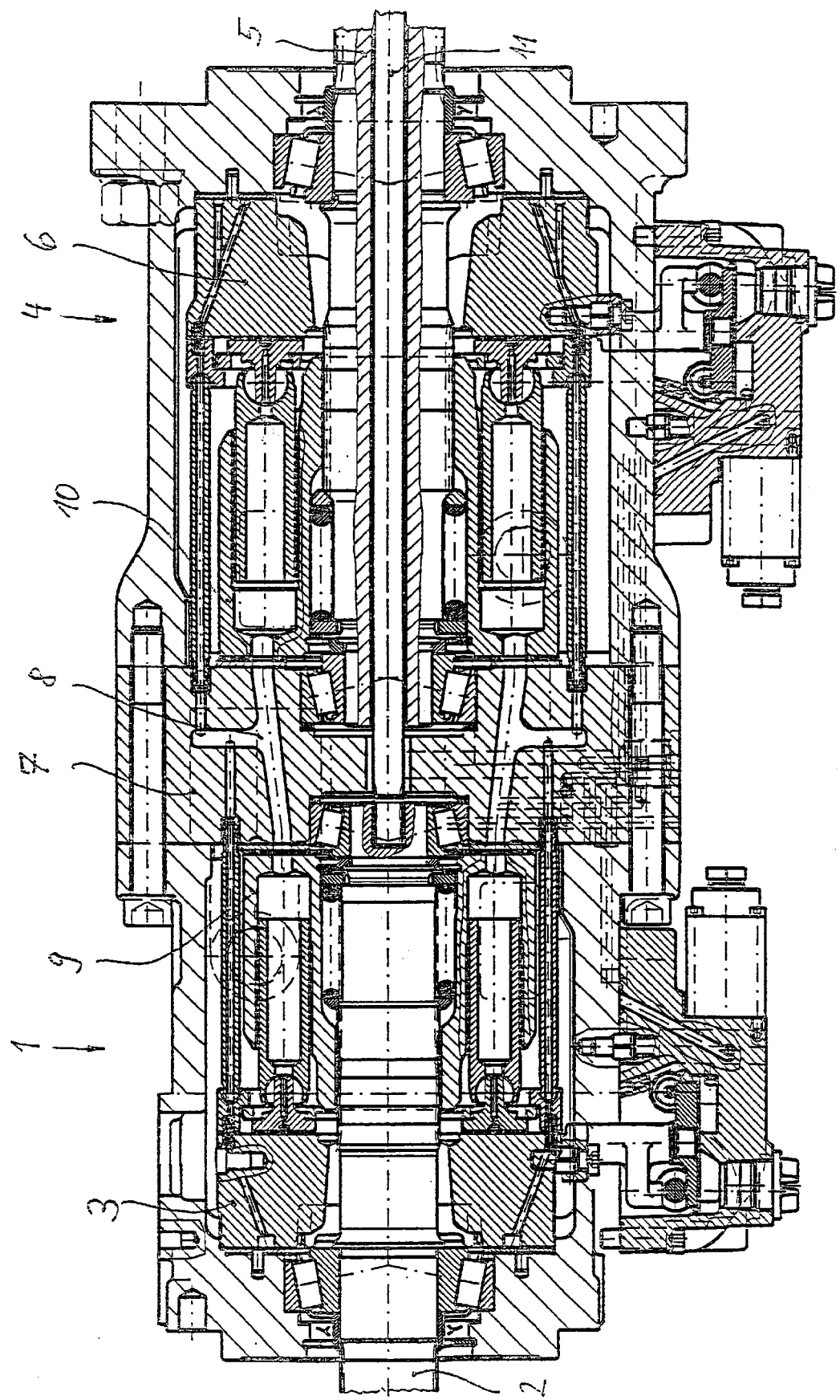

HYDROSTATIC TRANSMISSION

CROSS REFERENCE TO RELATED APPLICATION

This application corresponds to German Application No. 101 45 990.4 filed Sep. 18, 2001, which is herein incorporated by reference in its entirety.

BACKGROUND OF THE INVENTION

1. Field of the Invention

This invention relates generally to a hydrostatic transmission with a pump and a motor, each of which is designed as an axial piston engine utilizing a swashplate design, wherein the pump and the motor are arranged coaxially one behind the other and are connected to each other.

2. Technical Considerations

A known hydrostatic transmission is described in DE-OS 19 45 440.

An object of this invention is to provide a hydrostatic transmission of the general type described above but which is compact and can be used in an expanded range of potential applications.

SUMMARY OF THE INVENTION

The invention provides a hydrostatic transmission in which the motor has a hollow output shaft through which is routed a power take-off shaft driven by a drive shaft of the pump. It is, therefore, possible to use the driving motor, which is coupled with the drive shaft of the pump, to drive an additional unit, for example an auxiliary pump, whereby this is done centrally through the hydrostatic transmission comprising the pump and the motor. The hydrostatic transmission of the invention thereby has compact dimensions.

In one configuration of the invention that is advantageous in terms of its compact construction, the swashplate of the pump and the swashplate of the motor can be located on opposite ends of the hydrostatic transmission. A common control base mount can be located axially between the cylinder drum of the pump and the cylinder drum of the motor and can be provided with supply channels.

The power take-off shaft can be mounted inside the output shaft of the motor. In a particular embodiment of the invention, however, it is also possible to configure the power take-off shaft in the form of a torque rod that is free of radial stress.

In one advantageous configuration of the invention, the motor can be a variable displacement motor. A fixed displacement motor can also be used in the hydrostatic transmission taught by the invention.

As a result of the realization of the output shaft of the motor in the form of a hollow shaft, the torque that can be transmitted is lower than if the shaft were in the form of a solid shaft. It has been found to be advantageous if the motor is sized larger than is necessary for the torque that can be taken off the hydrostatic transmission, whereby the torque can be adjusted by reducing the pivoting angle of the swashplate. The full torque that the motor can generate on the basis of its size is thereby not exerted on the output shaft of the motor. This measure makes it possible to realize the output shaft in the form of a hollow shaft, which naturally can transmit only a lower torque than the torque that could be transmitted by a solid shaft of the same diameter.

BRIEF DESCRIPTION OF THE DRAWING

Additional advantages and details of the invention are explained below with reference to the exemplary embodiment that is illustrated in the accompanying drawing FIGURE showing a sectional view of a hydrostatic transmission incorporating features of the invention.

DESCRIPTION OF THE PREFERRED EMBODIMENTS

A hydrostatic transmission of the invention is shown in the drawing FIGURE and includes a pump 1 (for example, an axial piston pump utilizing a swashplate design) having a drive shaft 2 and a variable swashplate 3 located on a side of the pump 1 on which the drive shaft 2 is connected with or is connectable with a source of power (not shown in the FIGURE), such as an internal combustion engine.

A motor 4 (for example, an axial piston motor utilizing a swashplate design) is located in an extension of the axial piston pump 1 and is connected with the pump 1. The pump 1 and the motor 4 are coaxial to each other, i.e., the drive shaft 2 of the pump is aligned with an output shaft 5 of the motor 4.

On the side of the motor 4 on which the output shaft 5 emerges, there is a swashplate 6 of the motor 4 which, in the illustrated exemplary embodiment, is mounted so that it can pivot. The swashplates 3 and 6 of the pump 1 and of the motor 4, respectively, are therefore located compactly on the outer ends of the hydrostatic transmission. It thereby becomes possible to provide the pump 1 and the motor 4 with a common, centrally located control base mount 7 in which there are supply channels 8 to supply the cylinder drums 9 and 10 of the pump 1 and of the motor 4, respectively.

In one embodiment, the output shaft 5 of the motor 4 is a hollow shaft and is traversed by a power take-off shaft 11, which is synchronously connected on one end with the drive shaft 2 of the pump 1, and on the other end emerges from the output shaft 5 of the motor 4. Thus, the power take-off shaft 11 extends through the hollow output shaft 5. The power take-off shaft 11 can be connected, for example, with an additional pump or with another unit to be driven. It is possible to mount the power take-off shaft 11 inside the hollow output shaft 5 or, as illustrated in the FIGURE, to realize it in the form of a torque rod that is free of radial forces.

The motor 4 can be advantageously sized larger than is conventionally needed or that is anticipated to be needed for the torque to be generated on the output side by the hydrostatic transmission. The output shaft 5 can thereby be hollow. The maximum torque of the motor 4 can be set by a reduction of the pivoting angle of the swashplate 6.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A hydrostatic transmission, comprising:
   a pump having a drive shaft; and a motor,
   wherein the pump and the motor are each in the form of an axial piston engine having a swashplate,
   wherein the pump and the motor are located coaxially one behind the other and are connected with each other,
   wherein the motor includes a hollow output shaft through which is routed a power take-off shaft that is driven by the drive shaft of the pump, wherein the swashplate of the pump and the swashplate of the motor are located on opposite ends of the hydrostatic transmission, and a common control base mount having one or more supply channels is located axially between a cylinder drum of the pump and a cylinder drum of the motor, and wherein the power take-off shaft is a torque rod that is free of radial forces.

2. A hydrostatic transmission, comprising:

a pump having a drive shaft; and a motor, wherein the pump and the motor are each in the form of an axial piston engine having a swashplate, wherein the pump and the motor are located coaxially one behind the other and are connected with each other, wherein the motor includes a hollow output shaft through which is routed a power take-off shaft that is driven by the drive shaft of the pump, wherein the swashplate of the pump and the swashplate of the motor are located on opposite ends of the hydrostatic transmission, and a common control base mount having one or more supply channels is located axially between a cylinder drum of the pump and a cylinder drum of the motor, and wherein the motor is a variable displacement motor.

3. A hydrostatic transmission, comprising:

a pump having a drive shaft; and a motor, wherein the pump and the motor are each in the form of an axial piston engine having a swashplate, wherein the pump and the motor are located coaxially one behind the other and are connected with each other, wherein the motor includes a hollow output shaft through which is routed a power take-off shaft that is driven by the drive shaft of the pump, wherein the swashplate of the pump and the swashplate of the motor are located on opposite ends of the hydrostatic transmission, and a common control base mount having one or more supply channels is located axially between a cylinder drum of the pump and a cylinder drum of the motor, and wherein the motor is sized larger than is necessary for a desired torque that can be taken off the hydrostatic transmission, and wherein the torque is adjustable by reducing a pivoting angle of the swashplate of the motor.

4. A hydrostatic transmission, comprising:

a pump having a drive shaft; and a motor, wherein the pump and the motor are each in the form of an axial piston engine having a swashplate, wherein the pump and the motor are located coaxially one behind the other and are connected with each other, wherein the motor includes a hollow output shaft through which is routed a power take-off shaft that is driven by the drive shaft of the pump, and wherein the power take-off shaft is a torque rqd that is free of radial forces.

5. The hydrostatic transmission as claimed in claim 4, wherein the motor is a variable displacement motor.

6. The hydrostatic transmission as claimed in claim 4, wherein the motor is sized larger than is necessary for a desired torque that can be taken off the hydrostatic transmission, and wherein the torque is adjustable by reducing a pivoting angle of the swashplate of the motor.

7. A hydrostatic transmission, comprising:

a pump having a drive shaft; and a motor, wherein the pump and the motor are each in the form of an axial piston engine having a swashplate, wherein the pump and the motor are located coaxially one behind the other and are connected with each other, wherein the motor includes a hollow output shaft through which is routed a power take-off shaft that is driven by the drive shaft of the pump, and wherein the motor is a variable displacement motor.

8. The hydrostatic transmission as claimed in claim 7, wherein the motor is sized larger than is necessary for a desired torque that can be taken off the hydrostatic transmission, and wherein the torque is adjustable by reducing a pivoting angle of the swashplate of the motor.

9. A hydrostatic transmission, comprising:

a pump having a drive shaft; and a motor, wherein the pump and the motor are each in the form of an axial piston engine having a swashplate, wherein the pump and the motor are located coaxially one behind the other and are connected with each other, wherein the motor includes a hollow output shaft through which is routed a power take-off shaft that is driven by the drive shaft of the pump, and wherein the motor is sized larger than is necessary for a desired torque that can be taken off the hydrostatic transmission, and wherein the torque is adjustable by reducing a pivoting angle of the swashplate of the motor.

* * * * *

UNITED STATES PATENT AND TRADEMARK OFFICE
CERTIFICATE OF CORRECTION

PATENT NO. : 6,775,977 B2
DATED : August 17, 2004
INVENTOR(S) : Harald Stein

It is certified that error appears in the above-identified patent and that said Letters Patent is hereby corrected as shown below:

Column 3,
Line 39, "wherein the swashplatc" should read -- wherein the swashplate --.

Column 4,
Line 8, "a torque rqd" should read -- a torque rod --.

Signed and Sealed this

Eighteenth Day of January, 2005

JON W. DUDAS
*Director of the United States Patent and Trademark Office*